(12) United States Patent
Digeos et al.

(10) Patent No.: US 12,092,026 B2
(45) Date of Patent: Sep. 17, 2024

(54) NACELLE AIR INTAKE AND NACELLE COMPRISING SUCH AN AIR INTAKE

(71) Applicant: Safran Nacelles, Gonfreville L'Orcher (FR)

(72) Inventors: Virginie Emmanuelle Anne Marie Digeos, Moissy Cramayel (FR); Marc Versaevel, Moissy Cramayel (FR); Paul Oldham, Moissy Cramayel (FR); Patrick Boileau, Moissy Cramayel (FR)

(73) Assignee: Safran Nacelles, Gonfreville L'Orcher (FR)

( * ) Notice: Subject to any disclaimer, the term of this patent is extended or adjusted under 35 U.S.C. 154(b) by 0 days.

(21) Appl. No.: 17/510,803

(22) Filed: Oct. 26, 2021

(65) Prior Publication Data

US 2022/0042456 A1 Feb. 10, 2022

Related U.S. Application Data

(63) Continuation of application No. PCT/FR2020/050694, filed on Apr. 23, 2020.

(30) Foreign Application Priority Data

Apr. 26, 2019 (FR) ...................................... 19/04431

(51) Int. Cl.
*F02C 7/045* (2006.01)

(52) U.S. Cl.
CPC ........ *F02C 7/045* (2013.01); *F05D 2220/323* (2013.01); *F05D 2230/60* (2013.01)

(58) Field of Classification Search
CPC .... F02C 7/04; F02C 7/045; F02C 7/24; F05D 2220/323; F05D 2230/60
See application file for complete search history.

(56) References Cited

U.S. PATENT DOCUMENTS 6,328,258 B1 * 12/2001 Porte ...................... F02C 7/045
244/62
2002/0179773 A1 12/2002 Breer et al.
(Continued)

FOREIGN PATENT DOCUMENTS

| EP | 0913326 | 5/1999 |
| EP | 2305984 | 4/2011 |

(Continued)

OTHER PUBLICATIONS

International Search Report for International Application PCT/FR2020/050694, mailed Sep. 11, 2020.

*Primary Examiner* — Steven M Sutherland
(74) *Attorney, Agent, or Firm* — Burris Law, PLLC (57) ABSTRACT

An air intake for a nacelle for an aircraft engine includes a front lip connecting a substantially cylindrical internal wall and a substantially cylindrical external wall, and at least one acoustic structure including acoustic cells. The acoustic structure is situated in the space delimited by the internal wall, the external wall and the front lip. The acoustic structure is an added part secured to the air intake. The acoustic cells of the acoustic structure are arranged facing a region of the internal wall or of the lip at a predetermined distance so that the acoustic cells of the acoustic structure are not in contact with the internal wall or the lip while providing an acoustic attenuation function.

15 Claims, 8 Drawing Sheets

(56) References Cited

U.S. PATENT DOCUMENTS

| | | | | |
|---|---|---|---|---|
| 2009/0324390 A1* | 12/2009 | Harper | ................... | F02C 7/045 |
| | | | | 415/200 |
| 2010/0252685 A1* | 10/2010 | Porte | ..................... | B64D 15/04 |
| | | | | 244/134 B |
| 2013/0146393 A1* | 6/2013 | Porte | ....................... | B64F 5/00 |
| | | | | 29/896.2 |
| 2013/0224000 A1* | 8/2013 | Porte | ..................... | F02C 7/045 |
| | | | | 415/182.1 |

FOREIGN PATENT DOCUMENTS

| | | |
|---|---|---|
| FR | 2917067 | 12/2008 |
| FR | 2997726 | 5/2014 |
| FR | 3041937 | 4/2017 |
| FR | 3055612 | 3/2018 |

\* cited by examiner

NACELLE AIR INTAKE AND NACELLE COMPRISING SUCH AN AIR INTAKE

CROSS-REFERENCE TO RELATED APPLICATIONS

This application is a continuation of International Application No. PCT/FR2020/050694, filed on Apr. 23, 2020, which claims priority to and the benefit of FR 19/04431 filed on Apr. 26, 2019. The disclosures of the above applications are incorporated herein by reference.

FIELD

The present disclosure relates to an aircraft propulsion unit comprising a nacelle and an engine such as a turbojet engine, and concerns in particular an air intake of such a nacelle.

BACKGROUND

The statements in this section merely provide background information related to the present disclosure and may not constitute prior art.

An aircraft is moved by one or more turbojet engines each housed in at least one nacelle. The nacelle generally has a tubular structure comprising an air intake section upstream of the turbojet engine, a median section intended to surround a fan of the turbojet engine, and a downstream section accommodating the thrust reversal means.

The downstream section of the nacelle surrounds the gas generator of the turbojet engine which is terminated by an ejection nozzle located downstream of the turbojet engine.

The air intake section of the nacelle includes in particular a front lip of generally annular shape which intercepts the intake air flow of the nacelle which is directed towards a flow path.

To do this, the rest of the air intake structure has a substantially annular structure comprising an outer panel or wall ensuring the outer aerodynamic continuity of the nacelle and an inner panel or wall ensuring the inner aerodynamic continuity of the nacelle, in particular with the fan casing at the level of the median section. The air intake lip provides the junction between these two walls by forming a leading edge of the nacelle and can in particular be integrated into the outer panel thus forming a main wall of the air intake.

In general, the front lip is formed by an annular-shaped part which is directly attached to support partitions inside the nacelle. This part can be formed by a single piece or sectorized into a plurality of pieces (two, three or four pieces typically), this generally depending on the diameter and needs on the nacelle. In the case where the front lip is formed of pieces, these sectors are assembled by a joint bar and rows of fasteners to the areas of junctions to form said lip.

It is also noted that the use of an upstream partition which forms an annular "D"-shaped volume behind the front lip.

More precisely, the nacelle intake section generally includes:

an inner wall, preferably provided with a substantially cylindrical inner acoustic part having an upstream edge and a downstream edge, this part forming at least one portion of an acoustic shroud of the air intake being called "inner barrel";

a substantially cylindrical outer wall;

a front lip connecting the inner and outer walls;

a downstream mounting flange configured for mounting the intake section to a front flange of a wall of the turbojet engine; and a rear partition having a downstream end for securing the outer portion of the outer wall to the downstream mounting flange.

Moreover, the air intake generally comprises a de-icing system. A known type of de-icing or anti-icing system, presented in particular by documents EP 0 913 326 B1 or U.S. Published Application No. 2002/0179773 A1, includes a circular tube going around the nacelle, in the lip, which supplies hot air taken from the turbojet engine, the internal volume of the front lip of this nacelle in order to warm up its walls.

Moreover, to reduce the acoustic emissions of the turbojet engines, certain inner walls of the nacelle are lined with sandwich panels including a central core with honeycomb-shaped cells, which is covered by a sealed inner rear skin, and an outer front skin facing the sound source, which is perforated or porous.

The open cells then constitute a device of the Helmholtz resonator type, which contributes significantly to reduce the acoustic emissions.

The central core of the sandwich panel can have a single layer of cells, or two layers separated by a micro-perforated median skin, to improve the acoustic performance of the panel.

In particular, this type of acoustic panel is placed on the inner walls of the annular cold air flow path, in the case of a bypass turbojet engine, as well as on the inner wall of the upstream air intake. These panels come in particular to form the acoustic part (s) forming all or part of the acoustic shroud of the air intake, which are arranged in the internal space delimited by the lip and the inner and outer walls.

It is known, for example from document WO 2016/005711, to form the acoustic part with the lip by assembling them by brazing or by gluing, the brazing method being preferred in view of the temperatures involved during the de-icing.

The lip being made of aluminum, constraints impose the use of a compatible alloy, such as for example an aluminum alloy 6061 in order to be able to proceed with the brazing of a cellular structure, provided with acoustic cells, on the lip for integration into said lip of the acoustic part.

Nonetheless, the method for brazing the acoustic cells onto the air intake lip causes a certain number of challenges, including assembly challenges, while proving de-icing and the acoustic gain.

SUMMARY

This section provides a general summary of the disclosure and is not a comprehensive disclosure of its full scope or all of its features.

The present disclosure concerns an air intake for an aircraft engine nacelle, the air intake including a front lip connecting a substantially cylindrical inner wall and a substantially cylindrical outer wall, the air intake including at least one acoustic structure comprising acoustic cells, the acoustic structure is located in the space delimited by the inner wall, the outer wall and the front lip, the air intake being characterized in that the acoustic structure is an attached part fixed to the air intake by fixing means, the acoustic cells of the acoustic structure being arranged opposite an area of the inner wall and/or the lip at a predetermined distance configured so that the acoustic cells of the acoustic structure are not in contact with the inner wall and/or the lip while ensuring an attenuation acoustic function.

Thanks to these characteristics, it is possible to independently manufacture the air intake of the nacelle and the acoustic structure, in the form of at least one shroud for example, then to assemble them together regardless of their respective materials.

Such a predetermined distance forms a space between the acoustic cells on the one hand, and the wall of the air intake extending from the inner wall to the front lip on the other hand, allows the unit to be assembled with less impact on the lip.

It will be understood by the expression "opposite" that a space is formed directly between the acoustic cells of the acoustic structure of the inner wall and/or of the lip.

This predetermined distance must be large enough to inhibit contact of the acoustic cells with the inner wall and/or the wall of the lip, even this in the presence of vibrations.

Conversely, this predetermined distance must be small enough to guarantee the Helmholtz resonance in the acoustic cells forming a cavity, the inner wall and/or the wall of the lip having perforations facing the acoustic cells to allow the air flow lapping the air intake to produce this phenomenon of resonance of the air in the cavities of the acoustic structure. According to a particular technical configuration, the predetermined distance separating the acoustic cells from the area of the inner wall and/or of the lip is less than 1.5 mm. This distance is sufficient to inhibit contact between the two elements on the one hand and to maintain the acoustic performance of the system.

The acoustic cells, and more generally the acoustic structure, together have a shape according to the profile of the inner wall and/or of the lip so that this predetermined distance is substantially homogeneous over the entire extent of the acoustic structure.

In a particular configuration, the acoustic structure has a cellular structure forming the acoustic cells and an acoustically resistive skin, preferably formed from a metal alloy. Nonetheless, other materials can be used so that the cellular structure and the acoustically resistive skin can be formed from any materials compatible with the environment and making it possible to obtain such acoustic cells.

The expression "resistive skin" or "acoustically resistive skin" will be understood to mean a skin of the acoustic structure allowing the maintenance at least in part of an air flow received by the acoustic structure from the air flow path.

The attached acoustic structure is then formed by the acoustic cells and the acoustically resistive skin.

The area of the inner wall and/or the lip facing the acoustic cells of the acoustic structure is advantageously pierced to provide the acoustic function of the acoustic structure.

The pierced area then forms a pierced skin and allows reception at least in part of an air flow received from the air flow path.

More particularly, the wall of the air intake, in particular the area of the inner wall or of the lip, located opposite the acoustic cells has perforations so that the acoustic structure, with the perforated wall locally forming a perforated skin, together form an acoustic panel configured to form a Helmholtz resonator, thereby helping to reduce acoustic emissions.

The acoustic function of the acoustic structure can be realized when the attached acoustic structure formed by the acoustic cells and the acoustically resistive skin is mounted with the pierced area.

According to some configurations, the means for fixing the acoustic structure to the nacelle are rivets and/or a welding and/or a gluing.

In some aspects, the acoustic structure is fixed at its downstream end, on an angle iron or flange, or on a partition.

In some forms, the acoustic structure is mounted in cantilever relative to this angle iron or flange and/or this partition.

According to one particular characteristic, the acoustic structure is fixed at its upstream end, with the inner wall and/or the lip. In this case, the structure is not mounted in cantilever.

According to one aspect, the air intake includes at least in part a de-icing system generating a de-icing air flow from the air intake, which is configured so as to guide this air flow through orifices located upstream of the acoustic structure, or through perforations in the inner wall and/or the lip of the area facing the acoustic structure (40) forming a perforated skin for said acoustic structure (40).

According to another aspect, the present disclosure also concerns a nacelle for an aircraft engine, characterized in that it includes an air intake including all or part of the aforementioned characteristics.

According to another aspect, the present disclosure also concerns a method for manufacturing an air intake including all or part of the aforementioned characteristics, characterized in that it comprises the following steps:
 a step of manufacturing a lip and all or part of the inner and/or outer walls;
 a step of manufacturing the acoustic structure;
 a step of assembling the acoustic structure with said manufactured wall forming the lip and all or part of the inner and/or outer walls.

According to a technical characteristic, the acoustic structure is formed by brazing, additive manufacturing, stamping, forming of inserts, molding or injection.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of these figures, identical or similar references designate identical or similar members or groups of members.

Figure 1A:
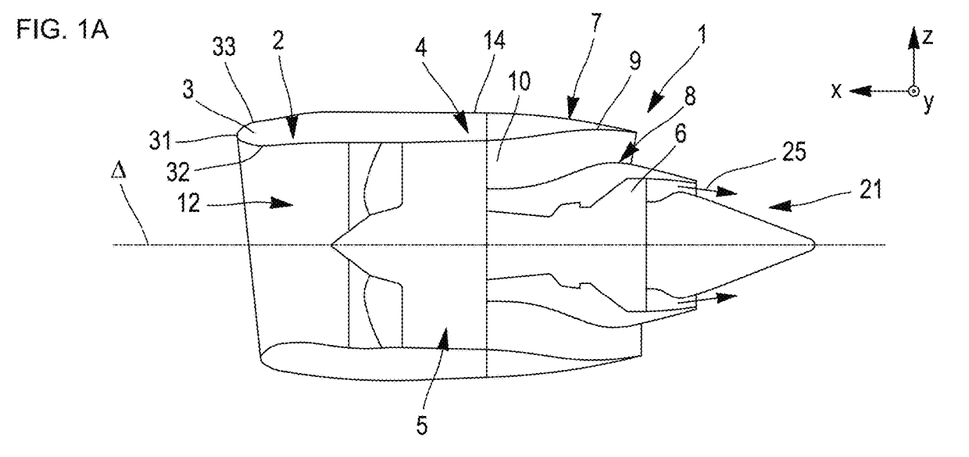
FIG. 1A is a partial schematic section of a nacelle and of an air intake according to the present disclosure.
Figure 1B:
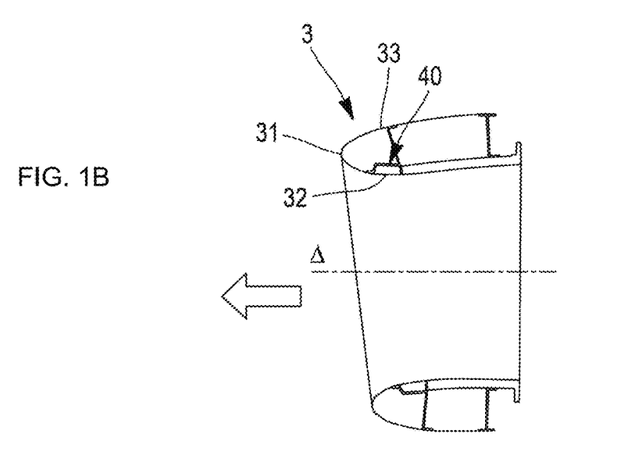
FIG. 1B is a partial schematic section of a leading edge of a nacelle and of an air intake according to the present disclosure.

As represented in FIGS. 1A and 1B, a nacelle 1 according to the present disclosure has a substantially tubular shape along a longitudinal axis A (direction parallel to X).

The nacelle 1 comprises an upstream section 2 with an air intake lip 3, a median section 4 surrounding a fan 5 of an engine 6 such as a bypass turbojet engine and a downstream section 7 accommodating a thrust reverser system (not visible), the nacelle serving to channel the air flows generated by the engine 6.

The air intake 3 is divided into two parts, namely on the one hand, an intake lip 31 adapted to allow improved capture towards the turbojet engine of the necessary air to the supply the fan and the inner compressors of the turbojet engine, and on the other hand, a downstream structure 32, 33 on which the lip is attached and intended to properly channel the air towards the blades of the fan. The assembly is attached upstream of a fan casing belonging to the median section 4 of the nacelle 1.

The downstream section 7 comprises an inner structure 8 (also called "inner fixed structure" or "IFS") surrounding the upstream portion of the turbojet engine 6, an outer structure (also called "outer fixed structure" or "OFS") 9 forming the cold flow channel and fixed relative to the engine, and a movable cowl including thrust reversal means. The inner structure or IFS 8 as well as the outer structure or OFS 9 are fixed relative to the movable cowl.

The IFS 8 and the OFS 9 delimit a flow path 10 allowing the passage of an air flow 12 penetrating the nacelle 1 at the level of the air intake lip 3.

The nacelle 1 includes a top 14 intended to receive an attachment engine pylon making it possible to fix said nacelle 1 to a wing of the aircraft. To do this, said top 14 includes means for fixing said engine pylon.

The turbojet engine nacelle is in particular suspended from the engine pylon, by means of a beam at the level of this top 14.

The nacelle 1 ends with an ejection nozzle 21.

Figure 2A:
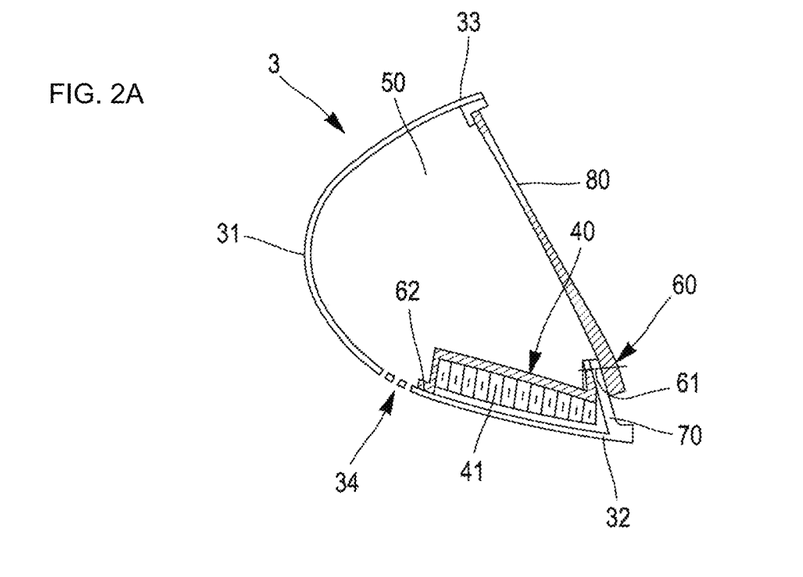
FIG. 2A is a sectional view of an air intake according to one form of the present disclosure.

As represented more specifically in FIG. 2A, the air intake 3 includes a front lip 31 forming the leading edge of the nacelle, said lip 31 connecting a substantially cylindrical inner wall 32 and a substantially cylindrical outer wall 33.

In other words, the air intake 3 has a substantially annular structure comprising the outer wall 33 ensuring the outer aerodynamic continuity of the nacelle 1 and the inner wall 32 ensuring the inner aerodynamic continuity of the nacelle 1, in particular with the fan casing at the median section 4.

The air intake lip 31 provides the junction between these two walls 32, 33 and can in particular be integrated into the inner 32 and/or outer 33 wall, thus forming a main wall of the air intake 3.

In other words, the walls 31, 32, 33 can be formed in one piece or integrally, thus forming the main wall of the air intake.

In order to reduce the noise pollution generated by the turbojet engine, at least part of the inner wall 32 of the air intake 3 is equipped with an acoustic structure 40, which is located in the space delimited by the main wall, namely the inner wall 32, the outer wall 33 and the front lip 31.

This acoustic 40 or acoustic attenuation structure is in the form of a cellular core panel forming a cellular structure whose cells delimit acoustic cells 41, the acoustic structure 40 further comprising a solid inner skin 42 ensuring in particular the mechanical resistance of the panel.

This acoustic structure 40 is preferably formed from a metal alloy. If the temperatures involved allow it, other materials can be used. These materials can also depend on the used manufacturing method, for example by thermoplastic molding, by additive manufacturing in aluminum, etc.

The air intake 3 further comprises, at the level of one of its walls 31, 32, 33 of the main wall, in particular at the level of an area 43 extending from the inner wall 32 to the lip 31, perforations 44 (not illustrated in these FIGS. 2A and 2B) located opposite the acoustic cells 41 of the acoustic structure 40.

Figure 2B:
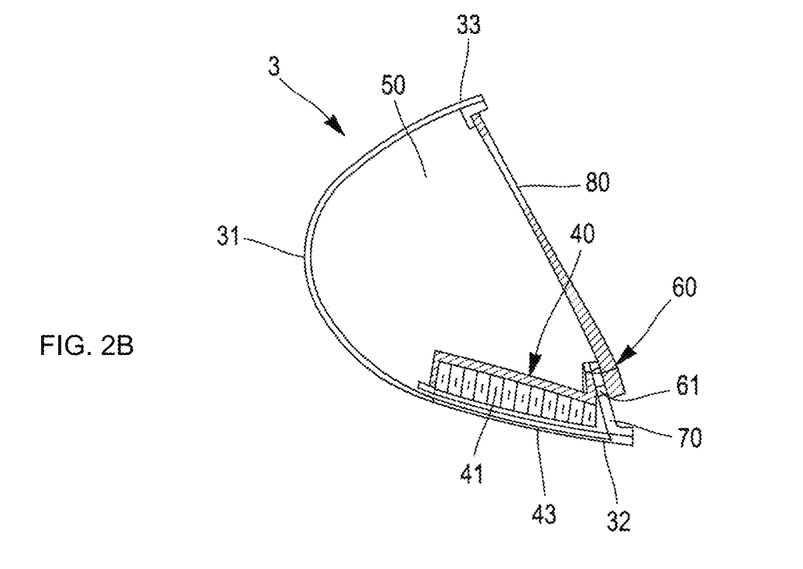
FIG. 2B is a sectional view of an air intake according to another form of the present disclosure.

This perforation area 43 of the air intake 3 locally forms a perforated skin or acoustic skin intended to be exposed to noise and which, associated with the acoustic structure 40, forms a resonator or Helmholtz resonator capable of trapping sound waves.

Moreover, the acoustic structure 40, formed in particular by the cellular core structure 41 and by the solid skin 42 is an attached part, manufactured separately from the main wall of the air intake 3 and fixed to said air intake 3 by fixing means 60.

Because this acoustic structure 40 is an attached part, it is possible to independently manufacture the air intake 3 of the nacelle 1 and said acoustic structure 40, then to assemble them together in a subsequent manufacturing step, regardless of their respective materials. This avoids in particular the implementation of a common manufacturing step, for example brazing, of the two parts together and all the constraints associated with such manufacturing.

The acoustic structure 40 is arranged opposite the wall extending from the inner wall 32 to the wall of the lip 31, that is to say the part of the air intake 3 oriented from the side of the air intake flow path, and placed at a predetermined distance configured so that the acoustic cells 41 of the acoustic structure 40 are not in contact with this main wall, this while ensuring an acoustic attenuation function.

Such a predetermined distance forms a space between the acoustic cells on the one hand, and the wall of the air intake 3 locally forming a pierced skin 43, makes it possible to facilitate the assembly of the air intake 3 with less impact on the lip 3.

This distance d is selected so as to be large enough to inhibit contact of the acoustic cells 41 with the main wall, even in the presence of vibrations during the use phase.

Conversely, this distance d is selected so as to be sufficiently small to guarantee the Helmholtz resonance in the acoustic cells 41 forming a cavity, the area 43 of the inner wall 32 and/or the wall of the lip 31 having perforations 44 facing the acoustic cells 41 to allow the air lapping the air intake 3 to produce this phenomenon of air resonance in the cavities of the acoustic structure 40.

In this aspect, this predetermined distance d is substantially equal to 1.5 mm.

The air intake 3 is fixed to the nacelle by means of a fixing flange. More precisely, the median section 4 of the nacelle 1 includes an inner panel exposed to the air flow and locally delimiting the flow path of the cold flow by surrounding the fan 5, this panel forming a fan casing.

The inner wall 32 of the air intake 3 is intended to be fixed to a fan casing (not visible) of the turbojet engine and thus to constitute a fixed part of the upstream section 2.

Moreover, the outer wall 33 of the air intake 3 is intended to be fixed to an outer wall of the median section.

The junction between the fan casing and the inner wall 32 of the air intake 3 is provided by means of at least one fixing flange, the flanges being distributed homogeneously circumferentially with respect to the air intake 3.

Each of the mounting flanges includes a rear part (not illustrated) located at an upstream end of a wall of the turbojet engine, for example of the fan casing, and a front portion secured to the inner wall 32 of the air intake, these two parts being secured to each other so as to allow the centering and fixing of the air intake 3 on the nacelle 1.

In this aspect (FIG. 2A), the acoustic structure 40 is fixed at its downstream end on a flange 70 which is separate from the mounting flange ensuring the fixing of the air intake 3 to the median section 4. In an alternative configuration, the acoustic structure can be fixed on the same flange, in particular on the front portion of the flange secured to the air intake 3 and configured to cooperate with the associated rear flange secured to the fan casing. This makes it possible to reduce the number of fixing interfaces in the air intake of the nacelle and therefore to reduce its mass.

Advantageously, the upstream end of the acoustic structure 40 can be fixed to the main wall, in particular to the inner wall 32 or that of the lip 31, by upstream fixing means 62.

Alternatively, to reduce the mass, the acoustic structure 40 can be mounted in cantilever (see FIG. 2B) on this flange 70. The acoustic structure 40 extends like a panel from a downstream end where it is fixed by downstream fixing means 61 to said flange 70 up to an upstream end directed towards the lip 31 inside the latter where it is kept in cantilever due to the rigidity of the acoustic structure 40. Thus, the acoustic structure 40 is fixed only on the flange 70 located downstream of the acoustic cells 41, that is to say at its downstream end.

The fixing means, or fastening device, 60, 61, 62 of the acoustic structure 40 forming a shroud to the nacelle 1 are for example rivets and/or a welding and/or a gluing.

According to the various forms illustrated in FIGS. 2A and 2B, the acoustically resistive skin 42 of the acoustic structure 40 includes a projecting downstream end forming a fixing tab, which is configured to be locally attached to the fixing flange 70 and preferably to be crossed by rivets 61 to provide fixation.

Upstream of the acoustic structure 40, the acoustically resistive skin 42 is configured to laterally cover the acoustic cells 41.

In the configuration illustrated in FIG. 2A, this acoustically resistive skin 42 extends upstream of the acoustic cells 41 and has a projecting end forming a fixing tab to be locally attached to the inner wall 32 of the air intake 3 where it can be fixed by upstream fixing means 62.

It will be noted that the acoustic structure 40 in general, in particular the acoustically resistive skin 42 and the acoustic cells 41 can be formed in one and the same part. This is particularly the case when the part is the result of additive manufacturing or injection type manufacturing.

In the configuration illustrated in FIG. 2B, this acoustically resistive skin 42 extends upstream of the acoustic cells 41 and has a suspended end arranged opposite the main wall, the acoustic structure 40 being mounted in a cantilever manner.

Figure 3:
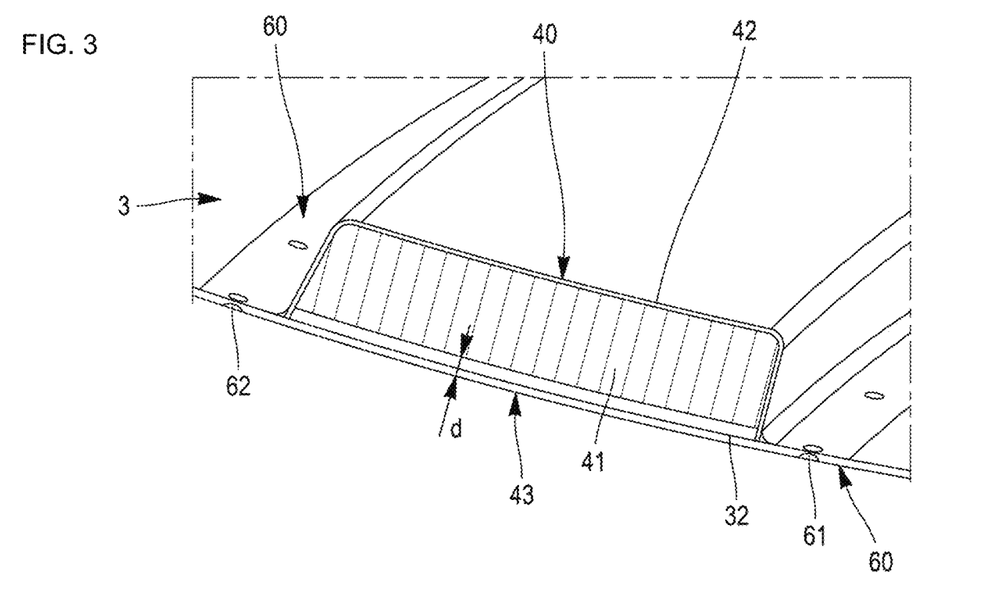
FIG. 3 is a sectional view of an acoustic structure according to one form of the present disclosure.

In comparison, FIG. 3 illustrates an aspect where the acoustic structure 40 is not fixed to a flange 70 but interfaced directly with the inner wall 32 at its two upstream and downstream ends. In other words, the acoustic structure 40 is fixed directly to the inner wall 32 at its two upstream and downstream ends.

In this way, the so-called acoustically resistive rear skin 42 is configured to laterally cover the acoustic cells 41 upstream and downstream of the cellular core 41 and has upstream and downstream projecting ends forming fixing tabs to be each locally contiguous to the inner wall 32 of the air intake 3 or they are crossed by rivets 62.

In these forms illustrated in FIGS. 2A and 3, the acoustically resistive rear skin 42 supports the cellular core delimiting the acoustic cells 41 and the dimensioning of the lateral portion of the rear skin bordering the cellular cells allows, by the choice of its height and depending on the thickness of the acoustic cells, to predetermine the distance d which separates the main wall of the air intake 3 with said acoustic cells 41.

Figure 4A:
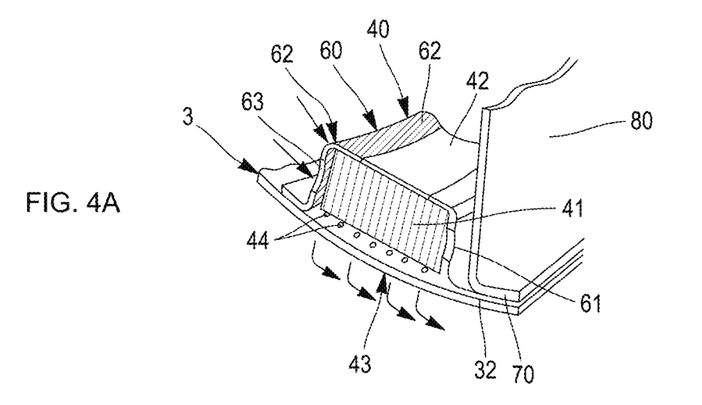
FIG. 4A is a perspective view of an acoustic structure according to another form of the present disclosure.

Alternatively, FIG. 4A illustrates one form of these fasteners where they are inserts forming angle irons which laterally cover the lateral edges delimiting the cellular core 41 of the acoustic structure 40.

Figure 4B:
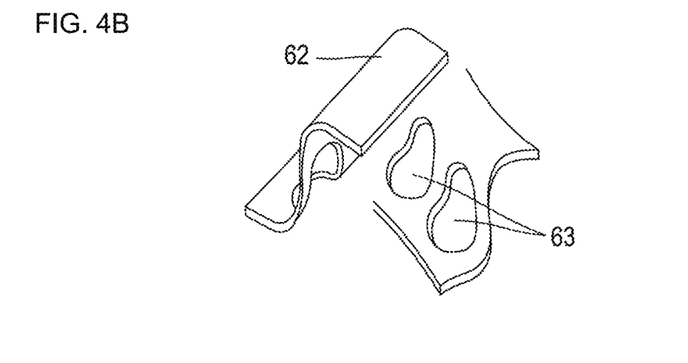
FIG. 4B is a detailed view of a means for fixing an acoustic structure according to the form illustrated in FIG. 4A.

These angle irons are illustrated in detail in FIG. 4B and have an upper end configured to be attached to the acoustically resistive skin 42 and a lower end configured to be attached by rivets 61, 62 to the inner wall 32, in a manner similar to the fixing tabs described above. These lower and upper ends are connected by a wall configured to border the cellular core 41 of the acoustic structure 40.

The air intake 3 further includes at least part of a de-icing system 51 and generating a flow of de-icing air from the air intake 3, generally comprising a tube 52 housed in an internal space 50 (see FIGS. 10A and 11A) delimited by the partition 80, the lip 31 and the inner 32 and outer 33 walls.

The air intake 3 may include a partition 80 which forms an annular volume behind the front lip 31 delimiting with it and, where appropriate with the inner 32 and outer 33 walls depending on the geometry, a generally annular "D"-shaped volume.

This partition 80 is preferably connected to the inner wall 32 at the level of the fixing flange 70 (see FIG. 2). According to a particular aspect, the partition 80 and the flange 70 can be formed in one and the same part. Also in one configuration, the acoustic structure 40 can be fixed at the level of an area located downstream of the acoustic cells 41, on this partition 80.

In general, the air intake 3 is configured so as to guide a flow of hot air generated by the de-icing system through orifices 34 located upstream of the acoustic structure 40 (see for example FIG. 2A), or through the perforations 44 of the inner wall.

With reference to FIG. 2A, the air intake 3 includes just upstream of the acoustic structure 40 a succession of orifices 34 distributed over the annular periphery of said air intake 3 and which allow a flow of hot air forming a substantially regular film sucked downstream in the flow path of the nacelle, and covering the area 43 of the main wall with a boundary layer of air, in particular of the inner wall 32 and/or the wall of the lip 31, having the perforations 44 facing the acoustic cells 41.

This boundary layer of hot air makes it possible to heat the inner wall 32 and/or the wall of the lip 31 to inhibit the formation of ice, or to perform de-icing guaranteeing good acoustic attenuation despite the conditions favorable to the formation of ice.

In particular, the film of hot air causes a deflection of the air droplets arriving upstream, which moves them away from the area 43 presenting the perforations facing the acoustic cells, as well as an evaporation of the droplets which have passed through this film, which are disposed on this panel.

The pattern of these orifices 34 and the shape of these orifices 34, in particular the diameter, the distribution, the taper or the inclination of these orifices 34, are adjusted so as to improve the thickness of the boundary layer of hot air, and to promote the deviation of the trajectory of the drops relative to the main wall of the nacelle, in particular of the inner wall 32 and/or the wall of the lip 31.

In the examples illustrated, the upstream portion of the front lip 31 and the part facing radially outwards do not have an acoustic structure and are heated in the usual way by the circulation of hot air in the annular volume 50.

A compromise is thus obtained allowing an acoustic structure to be placed as far upstream as possible on the air intake 3 of the nacelle 2, ensuring good acoustic performance, with an efficient de-icing system consuming a limited hot air flow, and with aerodynamic losses which remain low.

In order to obtain a boundary layer of hot air including an appropriate flow, allowing it to permanently lap this area 43 forming an acoustic skin on the acoustic structure 40, it is advantageous to adjust the flow of hot air as a function of the turbojet engine operating conditions by flow rate adjustment means.

In fact, if the boundary layer is detached from this wall, there is no longer any effective de-icing.

In particular on take-off of the aircraft, a high pressure of hot air supplied by the compressor of the turbojet engine is obtained, and the depression at the level of the lip 31 is important, then a low hot air injection flow rate will be achieved.

When descending, a lower hot air pressure supplied by the compressor is obtained, and the depression at the level of the lip 31 is also low, and a high hot air injection flow rate will then be achieved.

According to an alternative and/or complementary aspect, the space formed between the cellular cells 41 and the inner wall 32 (and/or the wall 31) communicates with the inner space 50 of the lip so that the air heated in this volume by the de-icing system can circulate towards this space to be evacuated through the perforations 44 of the inner wall 32.

In the case where the acoustic structure is in cantilever, whose fixing means 60, 61 are located only downstream of the acoustic cells 41 (see FIG. 2), this fluid communication can be provided through the opening defined between the upstream end of the acoustic structure and the wall of the air intake separated by a distance corresponding to the predetermined distance d.

In the case where the acoustic structure 40 has an upstream fixing means 62, said upstream fixing means 62 can form an obstacle to this fluid communication.

In this case, this fixing means such as an angle iron (see FIGS. 4A and 4B) can be perforated so that the flow of hot air can pass through orifices 63 of this angle iron.

It will be noted that the use of an acoustic structure 40 in cantilever presents an important advantage given that such a means of fixing downstream of the acoustic structure forming a suspension system is compatible with an electric de-icing system whose positioning can be located as closely as possible between the acoustic cells 41 and the acoustic skin 43 formed locally by the main wall, in the predetermined space of 1.5 mm for example.

Such an air intake according to the present disclosure is particularly advantageous in terms of the manufacturing method. Such a method for manufacturing the air intake 3 comprises the following steps:

on the one hand, a step of manufacturing a lip 31 and all or part of the inner 32 and/or outer 33 walls;

on the other hand, a step of manufacturing the acoustic structure 40.

The acoustic structure 40 is formed for example by brazing, additive manufacturing, stamping, forming of inserts, molding or injection. Of course, this list is not exhaustive and other manufacturing method can be used.

These two steps being separate, the choice of materials for their manufacture can be simpler, more suitable and more controlled while allowing savings.

Once these two parts have been manufactured, manufacture continues with a step of assembling the acoustic structure 40 with said manufactured wall forming the lip 31 and all or part of the inner 32 and/or outer 33 walls.

The present disclosure is described in the foregoing by way of example. It is understood that one skilled in the art is able to carry out different variant forms without however departing from the scope of the invention.

It will be noted for example that the acoustic structure can be formed integrally with the partition 80 and/or the flange 70. In this case, the means for fixing the acoustic structure to the air intake can be formed by those of the partition 80 and/or the flange 70 at the air intake In this case, the partition 80 and the flange 70 designate portions of the same part. Examples of this aspect of the present disclosures with such a part are illustrated in FIGS. 5, 6, 7, 8 and 9.

Figure 5:
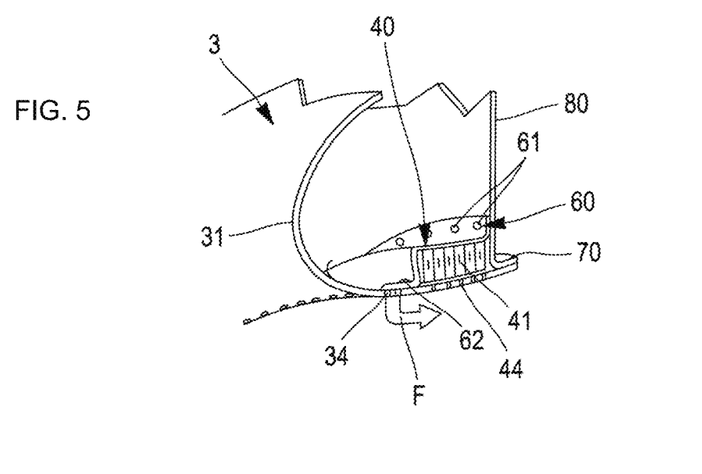
FIG. 5 is a schematic perspective view of an air intake portion according to one form of the present disclosure.

More specifically, FIG. 5 illustrates an aspect substantially similar to that of FIG. 2A, in which the partition 80 and the flange 70 are formed in one piece. The acoustic structure 40 extends like a panel from a downstream end where it is fixed by downstream fixing means 61 to the portion 70 of the part forming a flange or feet for fixing the partition 80, up to an upstream end directed towards the lip 31 inside the latter where it is fixed to the main wall, in particular the inner wall 32 or that of the lip 31, by upstream fixing means 62.

The air intake 3 is configured so as to guide this air flow F through bores or orifices 34 located upstream of the acoustic structure 40.

Figure 6:
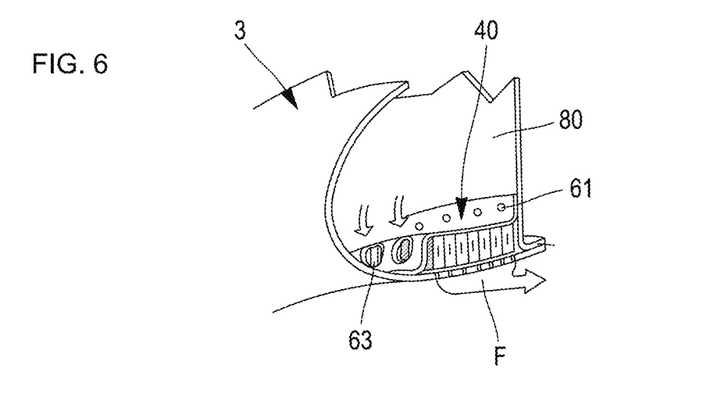
FIG. 6 is a schematic perspective view of an air intake portion according to another form of the present disclosure.

FIG. 6 illustrates a form of an air intake 3 which differs from that illustrated in FIG. 5 in that, upstream of the acoustic structure 40, the acoustically resistive skin 42 is configured to laterally cover the acoustic cells 41 and has a projecting end forming a fixing tab to be locally attached to the inner wall 32 of the air intake 3 or it is fixed by fixing means 62 of the welding or gluing type in this FIG. 6. The acoustically resistive skin 42 laterally covering the acoustic cells 41 is further perforated by orifices 63 so that the flow of hot air can pass through orifices 63, similar to those illustrated in FIG. 4B.

Figure 7:
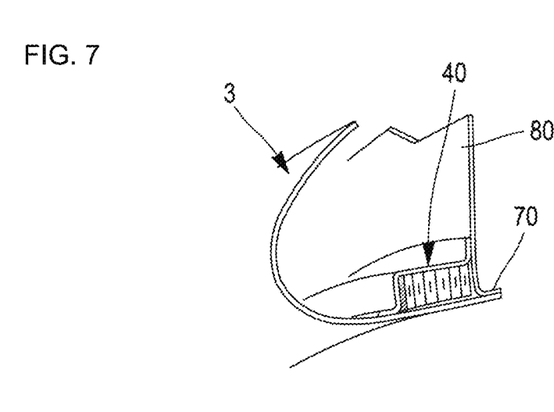
FIG. 7 is a schematic perspective view of an air intake portion according to yet another form of the present disclosure.

FIG. 7 illustrates one form of an air intake 3 which differs from that illustrated in FIG. 5 in that the upstream 62 and downstream 61 fixing means are not of the rivet type but of the welding and/or gluing and/or brazing type.

In the case of brazing, this is only possible for the downstream fixing means 61 at the level of the flange 70. As regards the upstream fixing means 62, others fixing means are implemented to avoid the drawbacks associated with brazing the acoustic structure with the lip.

Figure 8:
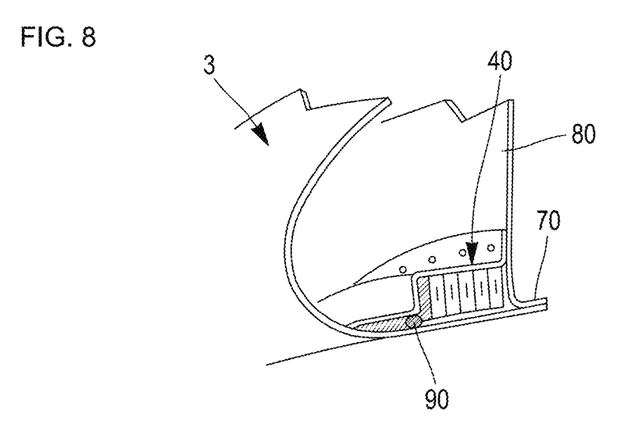
FIG. 8 is a schematic perspective view of an air intake portion according to still another form of the present disclosure.

FIG. 8 illustrates one form of an air intake 3 which differs from that illustrated in FIG. 5 in that the acoustic structure 40 is mounted in the same way as if it were in cantilever (see FIG. 2B) on the portion 70 of the part locally forming a flange 70. The acoustic structure 40 extends like a panel of a downstream end where it is fixed by downstream fixing means 61 to said flange 70 at an upstream end directed towards the lip 31 inside the latter where it is maintained in cantilever due to the rigidity of the acoustic structure.

Nonetheless, a seal 90 is interposed between the upstream end of the acoustic structure, in particular of the tab formed in the upstream extension of the acoustically resistive skin 42 laterally covering the acoustic cells 41, and the main wall of the air intake. This allows a lighter solution than using upstream fixing means 62.

Figure 9A:
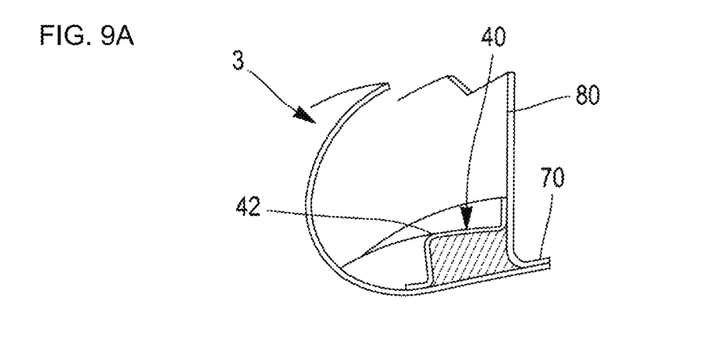
FIG. 9A is a schematic perspective view of an air intake portion according to the present disclosure.
Figure 9B:
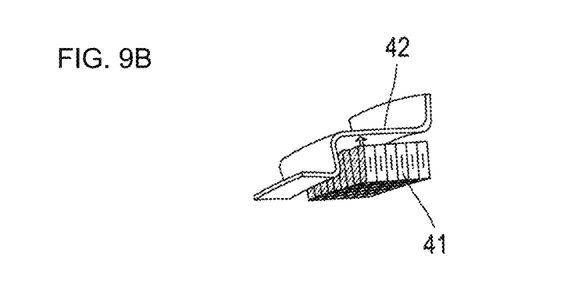
FIG. 9B is a schematic exploded perspective view of an acoustic cell of the air intake portion of FIG. 9A.
Figure 9C:
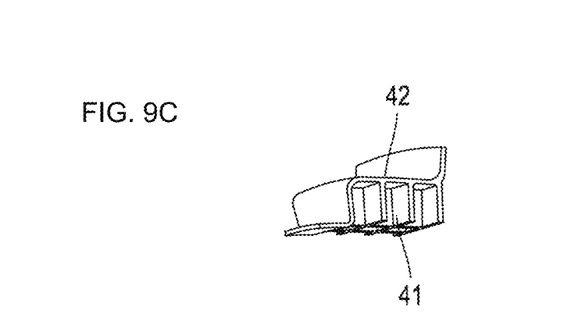
FIG. 9C a schematic perspective view of another form of an acoustic cell of the air intake portion of FIG. 9A.

Finally, FIG. 9 (FIGS. 9A-9C) illustrates one form of an air intake comparable to that of FIG. 7, where two detailed views of the acoustic cells 41 of the cellular core are illustrated. Thus, on the cutaway 9B a solution is illustrated in which the acoustic cells are formed by a honeycomb-type structure attached to the acoustically resistive skin 42 while the cutaway 9C illustrates a view where the acoustic cells are formed in one piece with the acoustically resistive skin 42, the structure together delimiting a cellular volume.

Figure 10A:
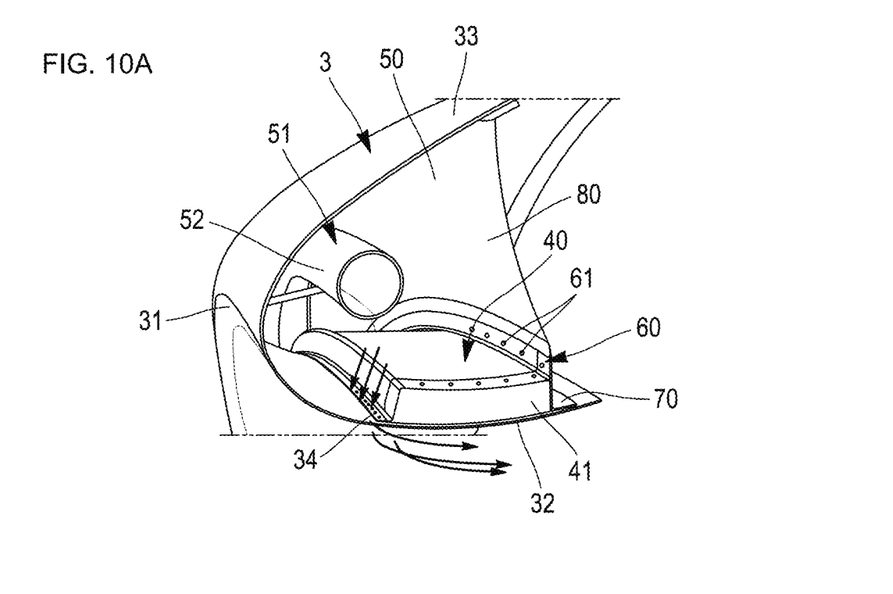
FIG. 10A is a schematic perspective view of an air intake portion having a de-icing system according to the present disclosure.
Figure 10B:
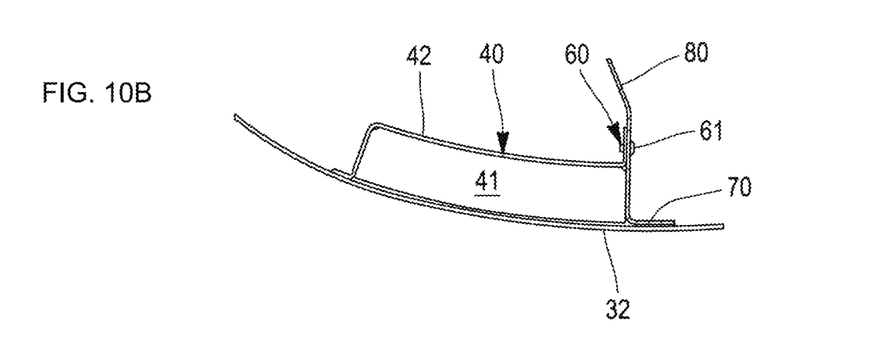
FIG. 10B is a detailed sectional view of the de-icing system of FIG. 10A.

FIGS. 10A and 10B illustrate a detailed aspect in which the partition 80 and the flange 70 are also formed in one piece and delimiting with the inner 32 and outer 33 walls and with the lip 31 an annular volume 50 inside which is housed a portion of the de-icing system 51 generating a de-icing air flow of the air intake 3. The air intake is here similar to that illustrated in FIG. 8, the air intake comprising a seal 90 interposed between the upstream end of the acoustic structure 40 in particular of the tab formed in the upstream extension of the acoustically resistive skin 42 laterally covering the acoustic cells 41, and the main wall of air intake 3.

Figure 11A:
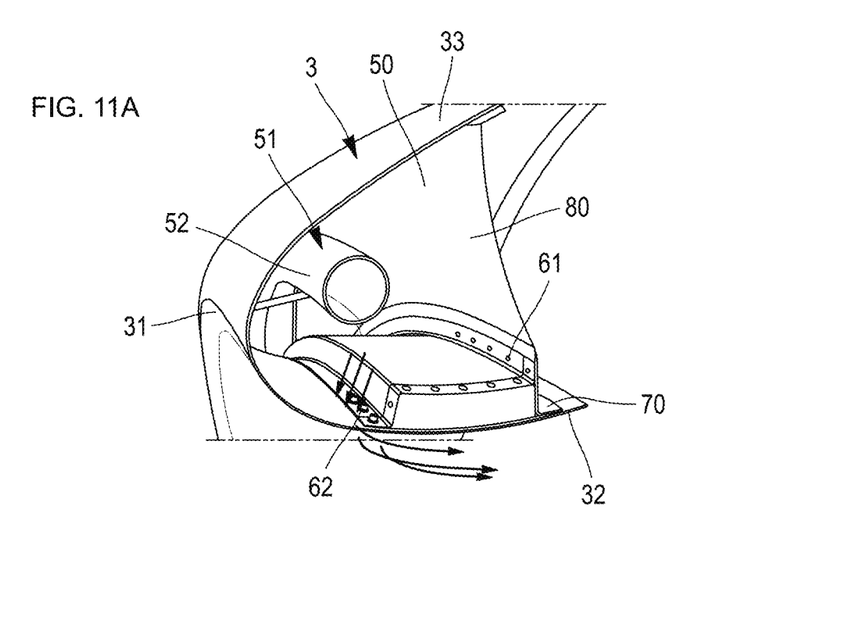
FIG. 11A is a schematic perspective view of another form of an air intake portion having a de-icing system according to the present disclosure.
Figure 11B:
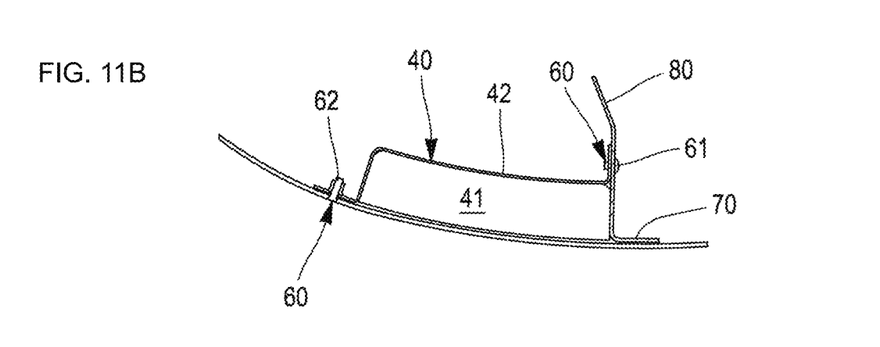
FIG. 11B is a detailed sectional view of the de-icing system of FIG. 11A.

FIGS. 11A and 11B illustrate an aspect substantially similar to the air intake illustrated in FIGS. 2A and 5 with the difference that the upstream 61 and downstream 62 fixing means comprise rivets.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air intake for an aircraft engine nacelle, the air intake including:
an inner wall;
an outer wall;
a front lip connecting the inner wall and the outer wall; and
at least one acoustic structure comprising acoustic cells, the at least one acoustic structure being located in a space delimited by the inner wall, the outer wall and the front lip,
wherein the at least one acoustic structure is fixed to the air intake, the acoustic cells of the at least one acoustic structure being arranged facing an area of the inner wall and/or the front lip at a predetermined distance configured so that the acoustic cells of the at least one acoustic structure are not in contact with the inner wall and/or the front lip,
wherein the predetermined distance separating the acoustic cells from said area of the inner wall and/or the front lip is 1.5 mm.

2. The air intake according to claim 1, wherein the at least one acoustic structure is fixed at a downstream end on at least one of an angle iron, a flange, and a partition.

3. The air intake according to claim 2, wherein the at least one acoustic structure is mounted in cantilever with respect to the angle iron, flange, or partition.

4. The air intake according to claim 1, wherein the at least one acoustic structure is fixed at an upstream end with at least one of the inner wall and the front lip.

5. The air intake according to claim 1, wherein the at least one acoustic structure has a cellular structure and an acoustically resistive skin.

6. The air intake according to claim 5, wherein the at least one acoustic structure is formed from a metal alloy.

7. The air intake according to claim 5, further comprising a seal, wherein an upstream end of the at least one acoustic structure comprises a tab formed in an upstream extension of the acoustically resistive skin, wherein the seal is interposed between the tab and the front lip.

8. The air intake according to claim 1, wherein the at least one acoustic structure is formed by at least one of brazing, additive manufacturing, stamping, forming of inserts, molding, and injection.

9. The air intake according to claim 1, further comprising a de-icing system configured so as to guide air flow through at least one of orifices located upstream of the at least one acoustic structure, perforations of the inner wall, and the front lip in an area located facing the at least one acoustic structure forming a perforated skin for said acoustic structure.

10. The air intake according to claim 1, wherein the at least one acoustic structure is fixed to the air intake by at least one of rivets, welding, and gluing.

11. A nacelle for an aircraft engine comprising an air intake according to claim 1.

12. A method for manufacturing an air intake according to claim 1, the method comprising:
- manufacturing the front lip and all or part of the inner and/or the outer walls;
- manufacturing the at least one acoustic structure; and
- assembling the at least one acoustic structure with said manufactured wall forming the front lip and all or part of the inner and/or outer walls.

13. An air intake for an aircraft engine nacelle, the air intake including:
- an inner wall;
- an outer wall;
  - a front lip connecting the inner wall and the outer wall; and
  - at least one acoustic structure comprising acoustic cells, the at least one acoustic structure being located in a space delimited by the inner wall, the outer wall and the front lip,
- wherein the at least one acoustic structure is fixed to the air intake, the acoustic cells of the at least one acoustic structure being arranged facing an area of the inner wall and/or the front lip at a predetermined distance configured so that the acoustic cells of the at least one acoustic structure are not in contact with the inner wall and/or the front lip, and
- wherein the predetermined distance separating the acoustic cells from said area of the inner wall and/or the front lip is large enough to inhibit contact of the acoustic cells with the inner wall and/or the front lip and small enough to produce Helmholtz resonance in the acoustic cells.

14. The air intake according to claim 13, wherein the predetermined distance separating the acoustic cells from said area of the inner wall and/or the front lip is 1.5 mm.

15. An air intake for an aircraft engine nacelle, the air intake including:
- an inner wall;
- an outer wall;
  - a front lip connecting the inner wall and the outer wall; and
  - at least one acoustic structure comprising acoustic cells, the at least one acoustic structure being located in a space delimited by the inner wall, the outer wall and the front lip,
- wherein the at least one acoustic structure is fixed to the air intake, the acoustic cells of the at least one acoustic structure being arranged facing an area of the inner wall and/or the front lip at a predetermined distance configured so that the acoustic cells of the at least one acoustic structure are not in contact with the inner wall and/or the front lip,
- wherein the predetermined distance separating the acoustic cells from said area of the inner wall and/or the front lip is less than 1.5 mm.

* * * * *